United States Patent
Hassan et al.

(10) Patent No.: US 9,986,202 B2
(45) Date of Patent: May 29, 2018

(54) SPECTRUM PRE-SHAPING IN VIDEO

(71) Applicant: Microsoft Technology Licensing, LLC, Redmond, WA (US)

(72) Inventors: Amer Hassan, Kirkland, WA (US); Bill Verthein, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/083,119

(22) Filed: Mar. 28, 2016

(65) Prior Publication Data

US 2017/0280097 A1    Sep. 28, 2017

(51) Int. Cl.
| | |
|---|---|
| H04N 7/00 | (2011.01) |
| H04N 11/00 | (2006.01) |
| H04N 7/035 | (2006.01) |
| G06T 1/00 | (2006.01) |

(52) U.S. Cl.
CPC .......... *H04N 7/035* (2013.01); *G06T 1/0028* (2013.01); *G06T 2201/0051* (2013.01)

(58) Field of Classification Search
CPC .......... H04N 7/035; H04N 7/08; H04N 11/20; H04N 7/00
USPC .......... 348/463, 467, 473, 465, 723
See application file for complete search history.

(56) References Cited

U.S. PATENT DOCUMENTS

| | | | |
|---|---|---|---|
| 4,868,552 A | 9/1989 | Chang | |
| 4,868,654 A | 9/1989 | Juri et al. | |
| 5,051,817 A | 9/1991 | Takano | |
| 5,243,423 A * | 9/1993 | DeJean | H04N 5/913 348/473 |
| 5,689,562 A | 11/1997 | Hassan et al. | |

(Continued)

FOREIGN PATENT DOCUMENTS

| | | |
|---|---|---|
| CA | 2457988 A1 | 8/2005 |
| WO | 0231752 A1 | 4/2002 |

OTHER PUBLICATIONS

Marvel, et al., "Hiding Information in Images", In Proceedings of International Conference on Image Processing, vol. 2, Oct. 7, 1998, 4 pages.

(Continued)

Primary Examiner — Trang U Tran

(57) ABSTRACT

Information bits may be superimposed onto a transmitted image while reducing or minimizing the effects of the superimposed information bits on the transmitted image signal's frequency spectrum or image quality. A placement of superimposed information bits onto pixels of an image signal to be transmitted may be determined by testing a placement functions to determine whether the spectrum and/or image quality of the image signal with the superimposed information bits placed according to a placement function meets system criteria. Successive placement functions may be tested until an acceptable placement function is found. The information bits may be superimposed onto complete pixels or the information bits may be superimposed onto one or more least significant bits (LSBs) of each of the selected pixels. A transmitter may transmit superimposition information associated with a transmitted image to a receiver. A receiver may use the superimposition information to extract the information bits.

15 Claims, 6 Drawing Sheets

(56) References Cited

U.S. PATENT DOCUMENTS

| | | | |
|---|---|---|---|
| 6,023,302 A | 2/2000 | MacInnis et al. | |
| 6,339,449 B1 | 1/2002 | Ikeda et al. | |
| 6,343,181 B1 | 1/2002 | Ikeda et al. | |
| 6,381,262 B1 | 4/2002 | Ogino | |
| 6,389,055 B1* | 5/2002 | August | G06Q 30/02 |
| | | | 348/E7.017 |
| 6,603,576 B1 | 8/2003 | Nakamura et al. | |
| 6,728,883 B1 | 4/2004 | Kohashi et al. | |
| 7,099,379 B2* | 8/2006 | Nuytkens | H04B 1/707 |
| | | | 348/E7.024 |
| 7,176,850 B1 | 2/2007 | Itoh et al. | |
| 7,489,796 B2 | 2/2009 | Nakamura et al. | |
| 7,660,470 B2 | 2/2010 | Yano | |
| 7,679,678 B2* | 3/2010 | Kondo | H04N 5/4401 |
| | | | 348/465 |
| 8,023,746 B2 | 9/2011 | Ackley et al. | |
| 8,265,401 B2 | 9/2012 | Yoshimura | |
| 8,559,709 B1 | 10/2013 | Hobbs | |
| 2003/0026422 A1* | 2/2003 | Gerheim | H04N 7/1675 |
| | | | 380/210 |
| 2004/0169664 A1 | 9/2004 | Hoffman et al. | |
| 2004/0230802 A1 | 11/2004 | Moon | |
| 2006/0156009 A1 | 7/2006 | Shin et al. | |
| 2008/0137905 A1 | 6/2008 | Madrange | |
| 2008/0250240 A1 | 10/2008 | Celik et al. | |
| 2010/0005305 A1 | 1/2010 | Dixit | |
| 2011/0141233 A1 | 6/2011 | Tsukagoshi | |
| 2015/0010246 A1 | 1/2015 | Hepper | |
| 2016/0248466 A1* | 8/2016 | Hamilton | H04B 1/0466 |

OTHER PUBLICATIONS

Jung, et al., "Text Information Extraction in Images and Video: A Survey", In Journal of Pattern Recognition, vol. 37, Issue 5, May, 2004, 35 pages.

"International Search Report and Written Opinion Issued in PCT Application No. PCT/US2017023499", dated Jun. 19, 2017, 14 pages.

* cited by examiner

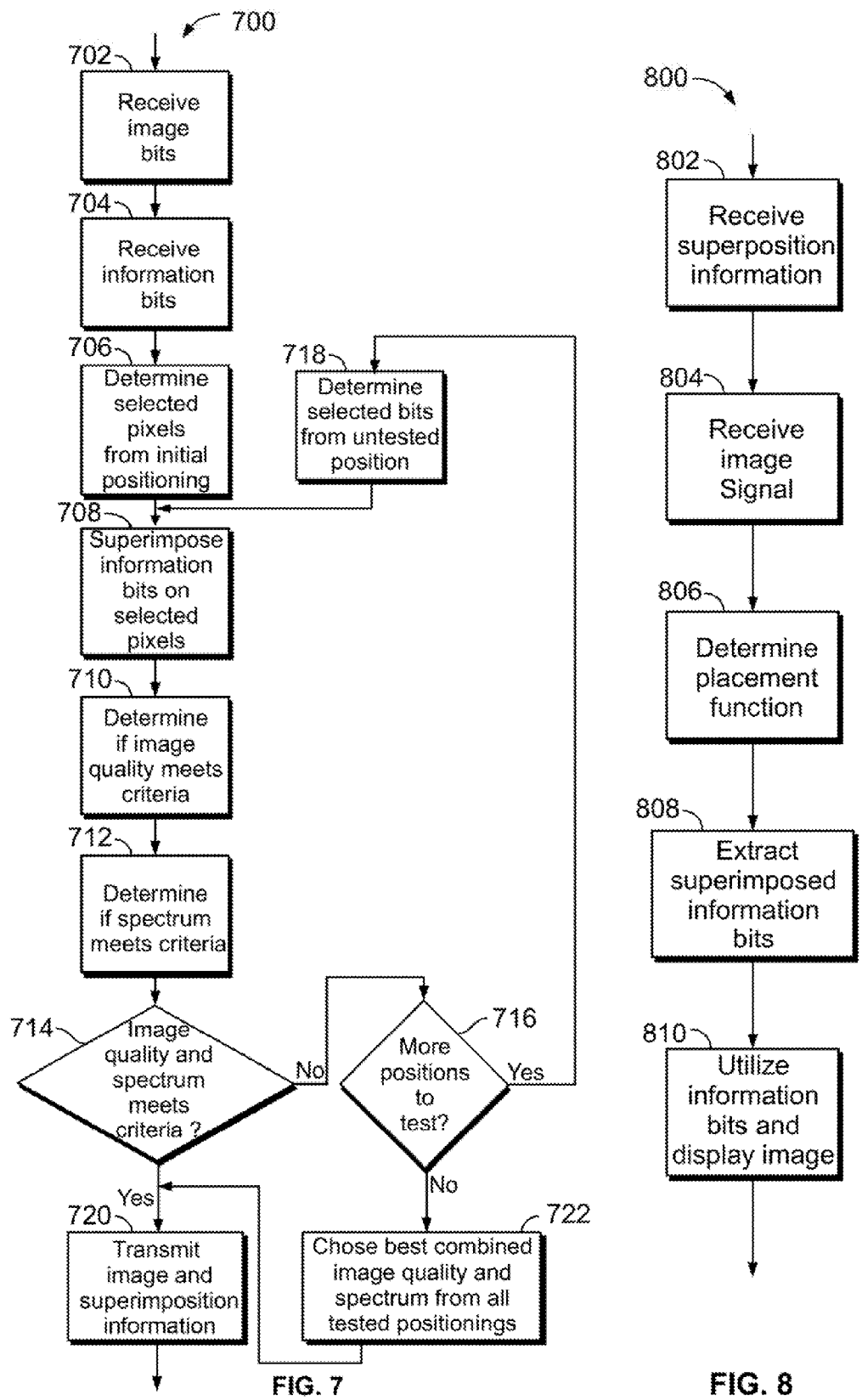

SPECTRUM PRE-SHAPING IN VIDEO

BACKGROUND

In wireless communications systems, video and images are sent by encoding image data bits onto a bit stream. When transmit as a wireless signal the bit stream exhibits frequency characteristics that include a frequency spectrum shape that relates directly to signal quality and how the signal should be processed for transmission. Normally a wireless communications system is designed so that the system can handle the spectrum shape of transmitted video and images without causing unacceptable interference or loss of data.

In some cases, it may be desirable to send information as data bits embedded in a transmitted image by replacing certain it data bits with information data bits. For example, information (such as hidden watermarks, overlying captions or text that is to appear in the image) may be sent by superimposing data bits of the information onto the image data bits. In conventional techniques the information bits are embedded or superimposed in place of image bits in certain image pixels, for example in a section at the top of an image. This is done without consideration beforehand of how the removal of image bits, and how the placing and embedding of information bits, will affect the shape of the transmitted image's frequency spectrum and the quality of an image. These effects on the frequency spectrum and image quality may be detrimental and cause unacceptable interference and loss of image data.

In existing systems, the effects on the shape of a transmitted image's frequency spectrum and the transmitted image's quality caused by removing image pixels and adding information bits are handled by using complicated techniques for coding/decoding and processing the transmitted and received image signals at the receiver. In some cases, critical image information may be lost and not be recoverable, and received image quality may not be acceptable.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus for superimposing information bits onto a transmitted image while reducing or minimizing the effects of the superimposed information bits on the transmitted image signal's frequency spectrum and transmitted image quality are provided. In the embodiments, a best or acceptable placement of superimposed information bits onto pixels of an image signal to be transmitted is determined by testing possible placements to determine whether the image signal with the superimposed information bits placed according to various placements meets predetermined signal criteria. For example, a testing of an image signal with possible placements of the superimposed information bits may involve testing the spectrum of the image signal or the quality of the image carried in the image signal until signal criteria are satisfied. Successive placements may be tested until an acceptable placement of the information bits is found. Effects on the shape of a transmitted image's frequency spectrum caused by removing bits of image pixels and adding information bits in place of the removed bits may be reduced or removed. Effects on the transmitted image's quality caused by removing bits of image pixels and adding information bits in place of the removed bits may also be reduced or removed.

In example embodiments, one or more pixels from a plurality of pixels comprising image bits may be selected to carry information bits. The information bits may include raw information bits or be coded information bits, for example forward error correction coded information bits. A placement function may be used to determine the selected pixels. The information bits may then be superimposed onto the selected pixels. The information bits may be superimposed onto complete pixels and the selected pixels may be completely replaced by the information bits or the information bits may be superimposed onto one or more least significant bits (LSBs) of one or more of the selected pixels. In the latter case the selected pixels may carry both image bits and information bits. In another example the placement function may determine the selected pixels from the plurality of pixels based on the criticality of the selected pixels to the image quality.

In an implementation, a signal may be generated from the plurality of pixels, including the superimposed information bits in the one or more selected pixels, and the frequency spectrum of the signal may be tested to determine if the spectrum satisfies a signal criteria based on signal spectrum. The signal criteria may be a spectrum criteria defined by a wireless system signal spectrum requirement. For example, the spectrum criteria may be associated with channel bandwidth capacity in a wireless system. In an implementation, the testing for satisfying the criteria may be performed by filtering the signal including the superimposed information bits and checking the filter output for compliance with a mask. The mask may be defined by spectrum characteristics that are stored in a database on a transmitting device and the mask may be updated at selected times according to system considerations. For implementations in mobile devices, a test for peak to average power ratio of the signal including the superimposed information bits may also be performed as part of the determination as to whether the signal meets system signal criteria.

In another implementation, a signal may be generated from the plurality of pixels, including the superimposed information bits in the one or more selected pixels, and the quality of the image carried in the signal may be tested to determine if the quality of the image satisfies a signal criteria based on image quality criteria. The signal criteria in this implementation may be defined as a maximum deviation of quality of the image carried in the signal including the superimposed information bits as compared to the quality of the image prior to superimposition of the information bits.

In other implementations, various signal criteria for determining if the signal including the image and the superimposed information bits meets signal criteria requirements may be utilized separately or in combination. For example, the determination as to whether the image signal including the superimposed information bits placed according to a placement meets a signal criteria may include determining whether a combined signal criteria is met, where the combined signal criteria include both a signal spectrum criteria and an image quality criteria.

An action based on a result of the determination of whether or not the signal that includes the image and the imbedded information bits satisfies the signal criteria may be initiated. If the signal criteria is satisfied, the signal including the image and superimposed information bits in the one or more selected pixels, may be transmitted. If the signal does not satisfy the signal criteria, a second placement function that provides a second set of one or more pixels may be used to determine a second set of selected pixels to carry the information bits. A second signal may be generated from the plurality of pixels, including the image and the superimposed information bits in the second set of one or more pixels as the selected pixels, and the second signal may be tested to determine if the second signal satisfies the signal criteria. If the second signal, satisfies the criteria, the second signal, including the image and the superimposed information bits in the second set of one or more selected pixels, may be transmitted.

If the second signal does not satisfy the criteria, the process may be repeated using a succession of different placement functions until a signal is generated from the plurality of pixels that includes the superimposed information bits and that meets the criteria is found. That signal may then be transmitted. In an implementation, the number of placement functions used may be a set number, N, of placement functions. If none of the N signals, including the superimposed information bits generated using the using N placement functions are determined to meet the signal criteria, the placement function that generates a preferred signal having most preferred tested parameters related to the signal criteria of the N signals may be chosen from the N placement functions. That preferred signal may then be transmitted. For example if the signal criteria comprises a spectrum requirement and none of the N placement functions meet the criteria, the image signal with the best spectrum that is closest to meeting the criteria may be chosen.

In an implementation, a transmitter that is transmitting an image signal including information bits superimposed on a plurality of pixels may also transmit superimposition information to a receiver. The superimposition information may include an indication of a placement function that was used to superimpose the information bits onto the image pixels. A receiver may receive the image signal and superimposition information and use the superimposition information to extract the information bits from the image signal. The indication of the placement function may be the function itself or an identifier identifying a predefined placement function that the receiver may retrieve from a database of placement functions. The superimposition information may also include a number of the information bits and/or location information for use by the receiver in extracting the information bits from the image signal. The location information may be, for example, a reference position that indicates a position of a pixel in the image that provides a starting reference for applying a placement function and extracting the information bits from the image signal.

BRIEF DESCRIPTION OF THE DRAWINGS

FIGS. 6A-5B are diagrams illustrating example selections of pixels where information bits are superimposed onto the LSBs of the pixels;

FIG. 7 is a flow diagram illustrating example operations performed according to another implementation in a transmitting device;

FIG. 8 is a flow diagram illustrating example operations performed by a receiving device; and, FIG. 9 is a simplified block diagram illustrating an example device implemented according to the disclosed embodiments.

DETAILED DESCRIPTION

Figure 1:
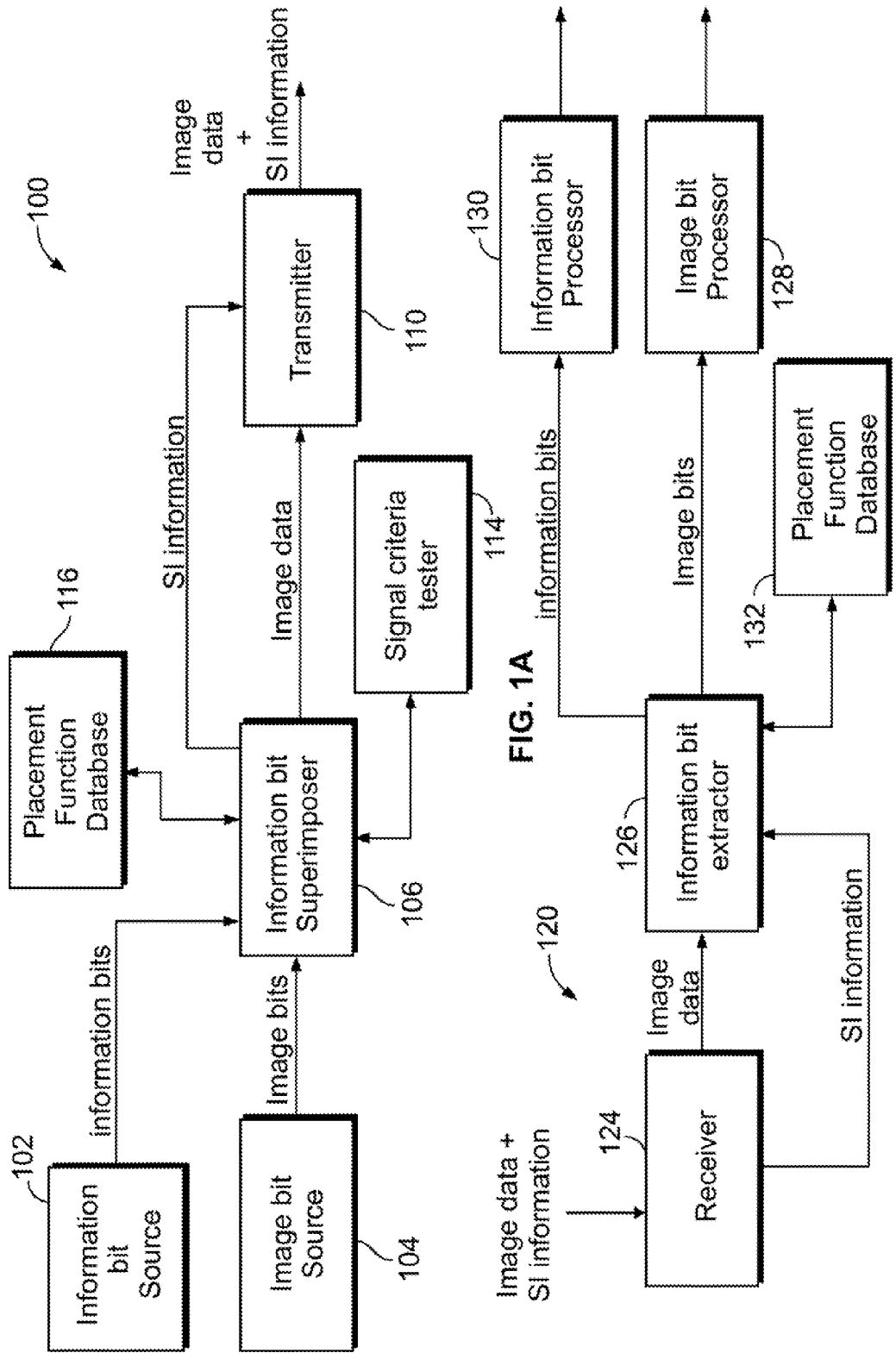
FIG. 1A is a simplified block diagram illustrating an example transmitting device.
FIG. 1B is a simplified block diagram illustrating an example receiving device.

The system, method and apparatus will now be described by use of example embodiments. The example embodiments are presented in this disclosure for illustrative purposes, and not intended to be restrictive or limiting on the scope of the disclosure or the claims presented herein.

The disclosed embodiments provide a technical advantage in that effects on transmitted signal quality that may be caused by superimposing information bits onto an image included in the signal may be removed or reduced. Because the effects on signal quality of various potential placements of the superimposed information bits onto the image may be considered before transmitting the signal with the superimposed information bits, an acceptable placement may be determined and used. The acceptable placement may be one that meets a system requirement. The embodiments allow a receiver that receives the transmitted signal to reconstruct the image and information bits from the received signal without using complicated processing techniques that may be required when information bits are superimposed onto an image without consideration as to how the placement affects signal quality. Advantages are also provided by implementations that superimpose information bits onto an image by using placement functions configured to superimpose the information bits onto less critical portions of an image, for example portions of an image that may be reconstructed or estimated by information from surrounding portions of the image.

Implementations of the embodiments provide an advantage in that effects on transmitted signal quality that may be caused by superimposing information bits onto an image included in the signal may be contained within predefined performance or quality levels by applying signal criteria requirements to a signal before it is transmitted. The criteria requirements applied to the signal comprising the image and the superimposed information bits may be any criteria related to determining whether or not the superimposition of the information bits has degraded, or negatively affected, the signal as compared to the signal without the superimposed information bits. For example, requirements in the form of signal criteria for the frequency spectrum shape of transmitted signals or image quality carried in the transmitted signals may be defined. The frequency spectrum shape of a signal or the quality of an image that includes information bits superimposed onto the image according to a placement function may be tested for conformance with signal criteria before transmission by a transmitter. If the frequency spectrum of the signal or the image quality created according to the positioning function does not meet signal criteria, a different placement function may be used to create a second signal with the information bits superimposed differently on the image, and the frequency spectrum and image quality of that second signal may be tested for conformance with signal criteria. If that frequency spectrum and/or image quality of the second signal meets the signal criteria, the second signal may be transmitted. If the frequency spectrum and/or image quality of the second signal does not meet system requirements, more placement functions can be tested until a placement function is determined that results in a signal that meets system frequency spectrum shape and image quality requirements. Implementations of the embodiments also provide the advantage in that if no placement function cart be found that results in a signal that meets system frequency spectrum shape requirements, a preferred placement function may be determined from the image quality and frequency spectrum shape testing. For example, the placement function that results in a signal that is closest to meeting the signal criteria may be used to minimize the effects of the information bit superimposition on the image.

Advantages are also provided in receiving a signal that is created and transmitted according to the embodiments. A signal with superimposed information bits in an image need not be encoded with additional error correction to account for the effects of the superimposed bits on the signal. A transmitter may transmit only necessary information to a receiver to allow the receiver to receive a signal and extract information bits and image bits from the signal. The necessary information may comprise superimposition information related to the placement of the information bits in the image that includes minimum information to allow the receiver to process the signal. By utilizing databases in a transmitter and receiver to store predefined placement function information, bandwidth used to transmit superimposition information may be minimized. For example, a transmitter may send the superimposition information to a receiver as an index value that may be used to retrieve placement function information stored in a database on the receiver without transmitting all the placement function information.

Implementations of the disclosed embodiments also provide a technical advantage over existing methods of superimposing information bits onto images for transmission. In conventional systems, information bits may be superimposed onto images without determining or considering the effects of the superimposition of the information bits on the image quality or image signal frequency spectrum shape and bandwidth. These methods may require more complicated coding techniques and more intensive use of processing resources to recover the information and image bits than would be necessary if the effects of the information bit superimposition onto an image were taken into account before signal transmission.

Referring now to FIGS. 1A and 1B, therein are a simplified block diagram illustrating an example transmitting device and receiving device, respectively, according to an implementation of the embodiments. Transmitting device 100 includes information bit source 102, image bit source 104, information bit superimpose 106, signal criteria tester 114, placement function database 116, and transmitter 110. Receiving device 120 includes receiver 124, information bit extractor 126, placement function database 132, information bit processor 130, and image bit processor 128. Transmitting device 100 and/or receiving device 120 may be implemented in any type of communications device that transmits or receives images in any type of system or network. A communications device may include both a transmitting device 100 and a receiving device 120 according to FIGS. 1A and 1B, or may include only one of transmitting device 100 or receiving device 120 implemented separately. For example, wireless network such as a Wi-Fi network operating according to the IEEE 802.11 specifications, or cellular networks operating according to long term evolution (LTE) or other cellular system standards may include wireless device with a transmitting device 100 and/or a receiving device 120 according to FIGS. 1A and 1B. Transmitting device 100 and receiving device 120 may also be implemented in any other type of device configured to transmit or receive images and video on any type of communications channels, including channels implemented on optical fibers, physical wires or cables.

Figure 2:
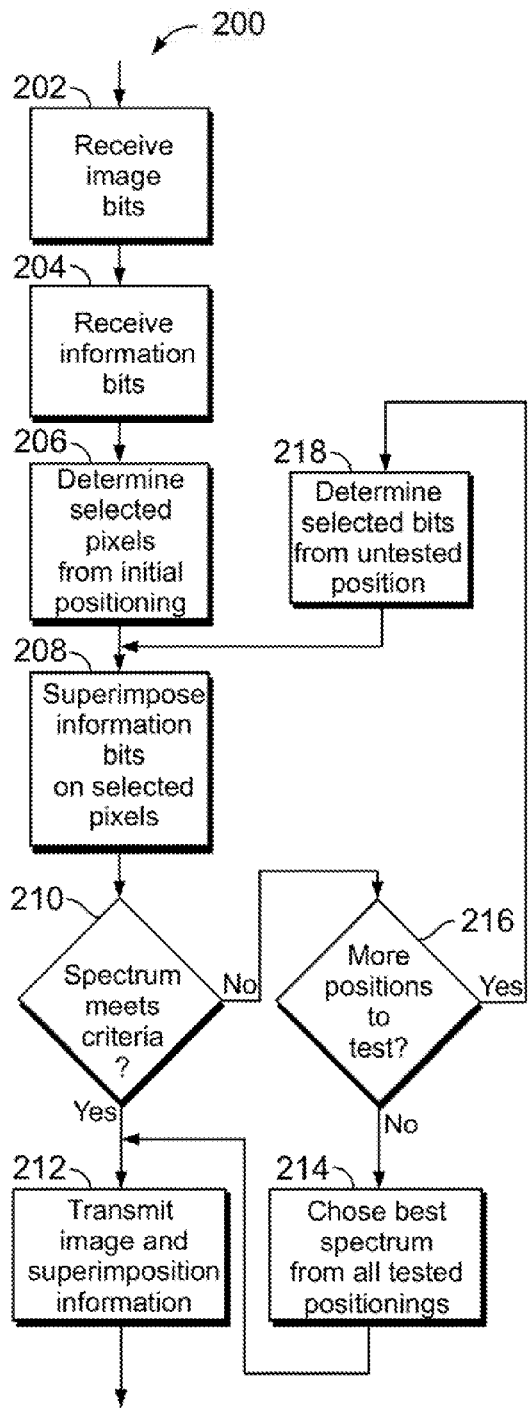
FIG. 2 is a flow diagram illustrating example operations performed according to an implementation in a transmitting device.

Referring now to FIG. 2 therein is a flow diagram illustrating example operations performed in a transmitting device 100 according to an implementation. In the implementation of FIG. 2, the operations may be performed in a communications device that includes appropriate processors or circuitry, and memory including program code, configured to perform the functions illustrated in FIG. 1A. FIG. 2 illustrates an implementation in which signal criteria tester 114 is configured to test whether the spectrum of a signal comprising image data and superimposed information bits meets system criteria for transmission.

The process begins at 202 where information bit superimpose 106 receives image bits from image bit source 184. The image bits may include bits having data on one or more still images, or bits having data on images that are portions or frames of a video. The image bits may include image bits encoded and configured as an array of image pixels. The image bit source 104 may be any type of source of video or image data. For example, image bit source 102 may be a video coder, operating according to one or more of the MPEG, DivX, Avid, or x264 video coder standards, or any other digital video encoding scheme. Image bit source may also provide images in formats such as JPEG, TIFF, GIF, or any other image format that digitally encodes an image.

At 204, information bit superimpose 106 receives information bits from information bit source 102. The information bits may be associated with a particular image or group of image bits. For example, the information bits may include a hidden watermark, or an overlying caption or text that is to appear in an image or images of a video carried by a group of image bits. The information bits may also include bits carrying any other information that may be transmitted with an image, including, for example, a second hidden image to be embedded in a first image, digital rights related information about a particular image or audio information or an audio clip associated with an image. In other implementations, the information bits may include information that is independent of and not related to the image in which it is embedded. The information bits may be raw data bits or be encoded in any form that may be decoded at a receiver. For example, the information bits may be coded for error correction.

At 206, information bit superimpose 106 determines one or more selected pixels from the image pixel array using an initial positioning selection. The positioning is used to determine positions in the pixel array from which the selected pixels are chosen. The number of the one or more selected pixels may be based on the number of information bits in order that there is enough bit space in the selected pixels to carry the information bits. The positioning may be based on information retrieved from placement function database 116. In other implementations, the positioning used at 206 may be any positioning that may be conveyed to a receiver so that the receiver will know the positioning of the selected pixels. In another implementation, the positioning may be determined based on a selection of one or more pixels that are selected because those one or more pixels carry image bits that are less critical to the transmitted image quality than other potential pixel selections.

At 208, information bit superimpose 106 superimposes or embeds the information bits onto the selected pixels of the image bits and creates a signal comprising image data that includes the superimposed information bits. For still images, the placement function may indicate locations in the two dimensional pixel arrays. For video, in one example, information bit superimpose 106 may choose the first image in a video CODEC frame to carry the information bits using a two dimensional placement function to indicate the placement of the superimposed information bits in that first image. In another example, information bit superimpose 106 may superimpose the information bits onto a selected image frame from the image frames of a video using a three dimensional placement function that indicates the selected image frame and the placement of the superimposed information bits in the pixels of the image frame.

At 210, signal criteria tester 114 determines whether the frequency spectrum of the signal comprising image data and the superimposed information bits meets spectrum criteria. The determination as to whether the frequency spectrum of the signal meets spectrum criteria may be performed by generating a filtered output from the signal and testing the filtered output for compliance with a mask based on system spectrum requirements. The system requirements for the mask may be imposed by regulation or by system standards requirements set by a standards body. The mask may be dynamically updated as system requirements change. For example, the mask may be based on a system design that reduces adjacent channel interference and may be updated dynamically when the traffic on the wireless network changes. When traffic load is low, the system may decide to avoid using adjacent channels and requirements on the mask may be less stringent by allowing greater spectrum deviation. In congested traffic situations or high data rate situations, adjacent and next adjacent channel interference may limit network performance and requirements on the mask may be made more stringent to require less spectrum deviation.

In an implementation, a test for peak to average power ratio may also be performed to test whether the signal meets system requirements. The peak to average power ratio test criteria may also be dynamically updated as system requirements change. The peak to average power ratio test may provide an advantage when the method is implemented in a mobile communications system.

If the spectrum of the signal comprising image data and the superimposed information bits meets spectrum criteria, the process moves to 212 and information bit superimpose 106 may initiate action by sending the signal to transmitter 110 to be coded, pulse shaped and transmitted to a receiving device. Information bit superimpose 106 may also initiate action by sending superimposition information to transmitter 110 to be transmitted to the receiving device. The superimposition information may comprise information related to the placement of the information bits in the image or video image frames and may include the minimum amount of information that allows a receiver to process the signal, in an implementation, the superimposition information may include a value X that indicates the number of information bits in the image, a location Pi that indicates a pixel location in the image pixel array to use as a reference in applying a placement function, and an indication of the placement function that was used by the Information bit superimpose 106 in the transmitting device. By utilizing databases in a transmitter and receiver to store predefined placement function information, bandwidth used to transmit superimposition information may be minimized. For example, a transmitter may send the superimposition information to a receiver as an index value associated with, for example, a particular positioning or placement function associated with a specific number of superimposed information bits X. The index may then be used to retrieve placement function information stored in a database on the receiver without transmitting all the placement function information.

If, at 210, the spectrum of the signal comprising image data and the superimposed information bits does not meet spectrum criteria, the process may move to 216 and information bit superimpose 106 may initiate an action to determine if there are more untested positions available from which a new set of one or more selected pixels may be chosen. If there are more positions to test the process moves to 218. At 218, information bit superimpose 106 determines the selected pixels from an untested position. The operations of 208 and 210 are then repeated. The process will continue through operations 208, 210, 216, and 218, until the spectrum of the signal comprising image data and superimposed information bits meets system criteria at 210 or until it is determined at 216 that all available positions have been tested. When it is determined that a signal meets system criteria at 210, that signal and its superimposition information is transmitted at 212. When it is determined, at 216 that no more positions are available to be tested, the best spectrum from all positions tested is chosen at 214 and the positioning that created that spectrum is used by information bit superimpose 106 to create the signal comprising image data and superimposed information bits. The signal created at 214 and its superimposition information is then transmitted at 212.

The superimposition information may be transmitted as needed, for example as often as information bit superimpose 106 changes positioning of the selected, pixels in any image sent to the receiver. In an implementation, information bit superimpose 106 may be configured to start the process of FIG. 2 each time the information bits change. For example, when new text is to be displayed, an initial acceptable positioning may be determined. If the information bits or image bits change causing the acceptable positioning to change, new superimposition information may be sent.

Figure 3:
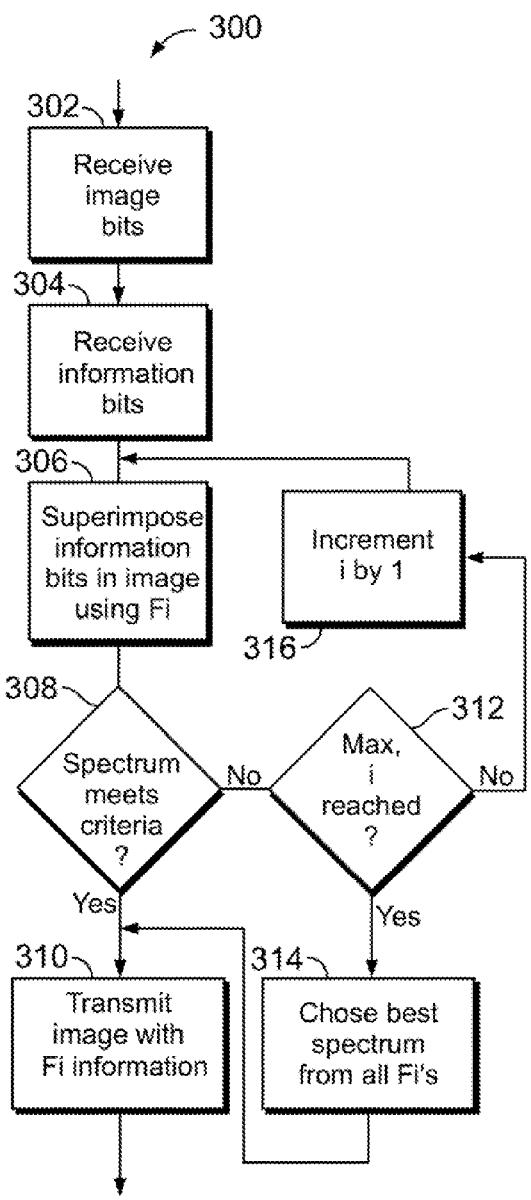
FIG. 3 is a flow diagram illustrating example operations performed by a transmitting device in an implementation of FIG. 2.

Referring now to FIG. 3 therein is a flow diagram illustrating example operations performed by a transmitting device in an implementation of the process of FIG. 2. FIG. 3 illustrates an implementation in which a predefined set of placement functions Fi are used to superimpose information bits onto an image for transmission. The process begins at 302 where information bit superimpose 106 receives image bits. At 304, information bit superimpose 106 also receives information bits to be superimposed onto the image represented by the image bits. At 306, information bit superimpose 106 superimposes the information bits onto the image using placement function Fi to identify selected pixel positions in the image pixel array onto which the information bits are superimposed. Information bit superimpose 106 may retrieve the set of functions Fi, where I=1 to n, from placement function database 116. In an implementation I may be set to an initial value, such as I, and incremented each time operation 306 is performed for an image being processed. Each placement function may include information or data in any form, mathematical or otherwise, that defines a series of pixel positions in an image pixel array. A total number of pixels may be selected so that all of the information bits are superimposed onto the image or image data. The set of placement functions may be configured and chosen so that each placement function of the set may handle positioning for a desired number, X, of information bits to be superimposed onto an image or image data. In the implementation of FIG. 3, the complete set of bits included in each selected pixel of the image is superimposed upon and replaced by information bits at operation 306 according to Fi, and information bit superimposer 106 creates a signal comprising image data that includes the superimposed information bits. Example selections of pixels onto which information bits may be superimposed are discussed below in relation to FIGS. 4A-4D.

Next, at 308, signal criteria tester 114 determines whether the spectrum of the signal comprising image data and superimposed information bits created according to placement function Fi meets spectrum criteria. The testing may be performed as was described for operation 210 of FIG. 2. If the spectrum of the signal meets system criteria, the signal comprising image data and superimposed information bits created according to placement function Fi is transmitted at 310. Superimposition information associated with Fi may also be transmitted along with the signal. The information associated with Fi may include an identification of Fi, which may be used by a receiver to retrieve Fi from a database, and other information that may not be determined from the identity of Fi, such as a number of superimposed information bits in the signal, and a reference pixel location, Pi, to base a starting pixel position for applying Fi, since Fi may have varying locations for a starting pixel position. In other implementations the information may include an indicator of a video image or frame in which the information bits are superimposed due to the selected image or frame varying.

If, however, at 308, it is determined that the spectrum of the signal comprising image data and superimposed information bits created according to placement function Fi does not meet spectrum criteria, the process moves to 312. At 312 a determination is made as to whether or not the complete set of placement functions Fi has been tested by checking if the maximum value of i has been reached, where the maximum value of i is equal to n, or the number of placement functions. If the maximum i has not been reached, the process moves to 316 where i is incremented by one and the operation at 306 is, repeated with the new placement function Fi+1. Operations 306, 308, 312 and 316 may be repeated until a signal is determined to have a spectrum that meets system criteria and the process ends though 310, or until it is determined at 312 that the maximum value of i has been reached. If it is determined at 312 that the maximum value of i has been reached the process moves to 314 where the best spectrum from all position functions tested is chosen and the position function that created that best spectrum, for example Fx, is used by information bits superimposes 106 to create the signal comprising image data and superimposed information bits. The signal created at 314 is then transmitted at 212 along with the information associated with Fx.

Figure 4A:
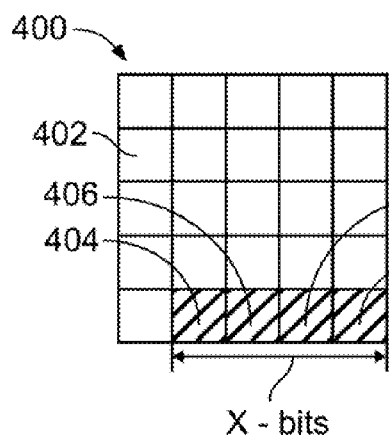
FIGS. 4A-4D are diagrams illustrating example selections of pixels onto which information bits are superimposed.
Figure 4B:
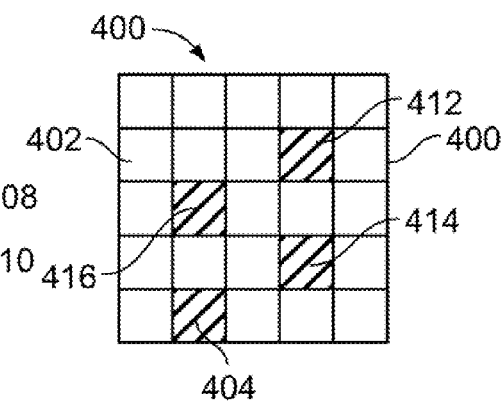
Figure 4C:
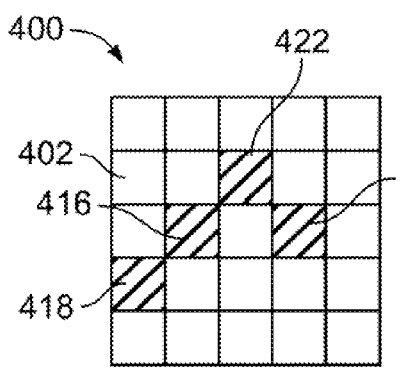
Figure 4D:
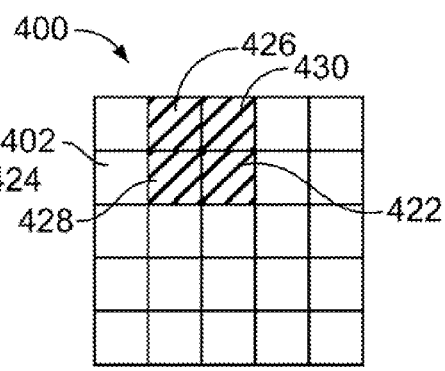

FIGS. 4A-4D illustrate example selections of pixels onto which information bits may be superimposed. Each of the example selections of FIG. 4A-4D may be according to a different position function Fi. FIG. 4A illustrates a pixel array portion 400 that includes image data encoded in pixels such as pixel 402. Array portion 400 may be a portion of a larger array of rows and columns of pixels, the size of which depends on the particular image/video/encoding done at image bit source 102. In FIG. 4A, selected pixels 404, 406, 408, and 410 have been superimposed upon with, information bits. Thus, information bits have been embedded into pixels 404, 406, 408, and 410 replacing image data with information bits. In the example portion shown in FIG. 4A, there are X information bits superimposed upon an appropriate number of pixels that are needed to carry all X information bits. All bit space in the selected pixels is utilized if the bits are needed to carry the X information bits. In implementations, the size of the pixel array, number of selected pixels, and number of information bits may be of any size or number. FIGS. 4B-4D illustrate further examples of selections of pixels of array 400 in which image bits are replaced with information bits. FIG. 4B illustrates selected pixels, 404, 414, 416, and 412, FIG. 4C illustrates selected pixels 418, 416, 422, and 424, and FIG. 4D illustrates selected pixels 428, 422, 426, and 430. In each of FIGS. 4A-4D a different placement function, for example, $F_1$-$F_4$, respectively, may define the selection of the pixels for superimposition of information bits.

Figure 5:
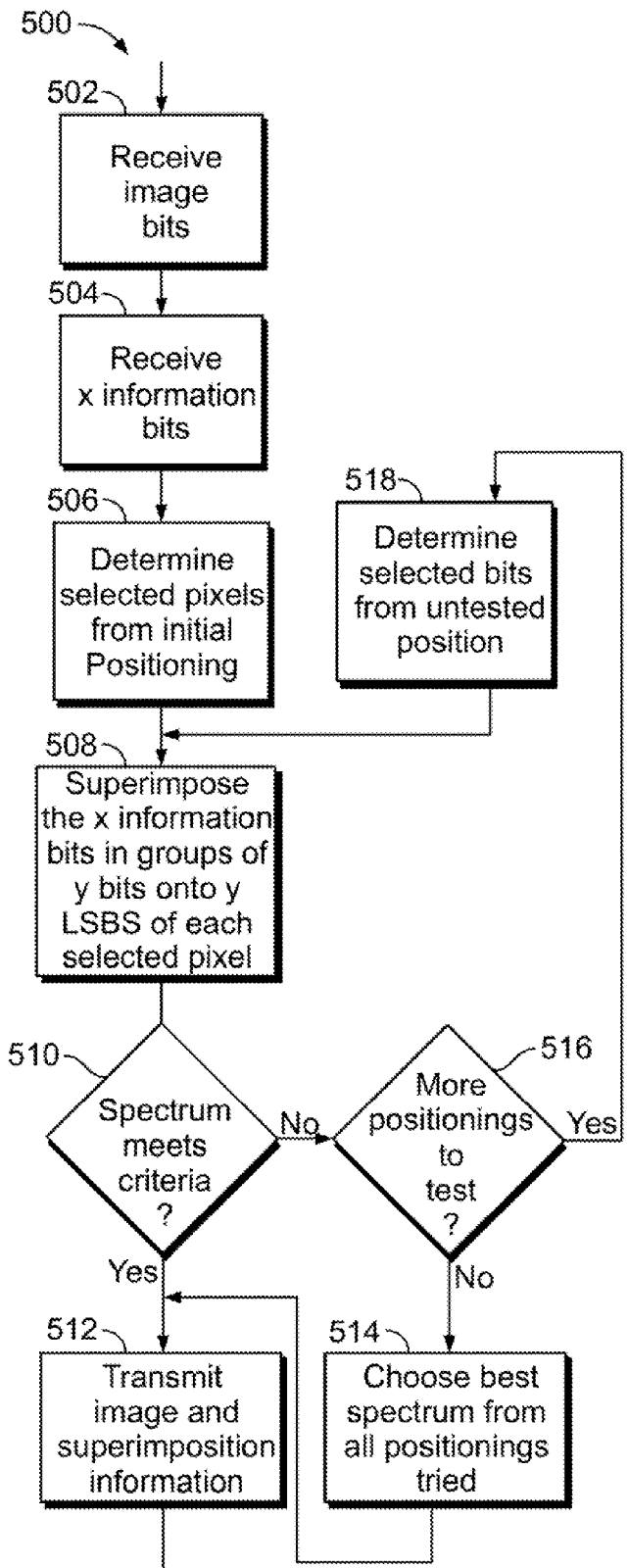
FIG. 5 is a flow diagram illustrating example operations performed by a transmitting device in another implementation of FIG. 2.

Referring now to FIG. 5, therein is a flow diagram illustrating example operations performed by a transmitting device according to another implementation of FIG. 2. FIG. 5 illustrates an implementation in which least significant bits (LSBs) of selected image pixels, are chosen for superimposition of information bits for transmission. The process begins at 502 where information bit superimposer 106 receives image bits. At 504 information bit superimposer 106 also receives X information bits to be superimposed onto the image represented by the image bits.

At 506, information bit superimposer 106 determines one or more selected pixels from the image pixel array using an initial positioning selection. The positioning is used to determine positions in the pixel array from which the selected pixels are chosen. The number of the one or more selected pixels may be based on the number of information bits, such that there is enough bit space in the designated LSBs of the selected pixels to carry the information bits. The positioning may be based on information retrieved from placement function database 116. In other implementations, the positioning may be any positioning that may be conveyed to a receiver so that the receiver will know the positioning of the selected pixels.

At 508, information bit superimposer 106 superimposes or embeds the information bits onto the selected pixels of an image or video image frame included in the image bits and creates a signal comprising image data that includes the superimposed information bits. The operation at 508 may be performed by processing the X information bits as groups of Y bits and superimposing, a group of Y information bits onto Y LSBs of each selected pixel. Example selections of pixels where information bits are superimposed onto the LSBs of the selected pixels are described below in reference to FIGS. 6A and 6B.

At 510, signal criteria tester 114 determines whether the frequency spectrum of the signal comprising image data and the superimposed information bits meets spectrum criteria. The determination as to whether the frequency spectrum of the signal meets spectrum criteria may be performed, for example, as was described for operation 210 of FIG. 2. If the spectrum of the signal comprising image data and the superimposed information bits meets system criteria the process moves to 512 and information bit superimposer 106 may then send the signal to transmitter 110 to be coded, pulse shaped and transmitted to a receiving device. Information bit superimposer 106 may also send superimposition information to transmitter 110 to be transmitted to the receiving device at 512. The superimposition information may comprise information related to the placement of the information bits in the image and include the minimum amount of information that allows a receiver to process the signal. In an implementation the superimposition information may include a value X that indicates the number of information bits in the image, a value Y that indicates the number of LSBs of each selected pixel that included information bits, a location Pi that indicates a pixel location in the image pixel array to use as a reference in reconstructing the selected pixels at the receiver and/or an indication of the placing or placement function that was used by the information bit superimposer 106 in the transmitting device. In other implementations the information may include an indicator of a video image or frame in which the information, bits are superimposed if that selected image or frame varies.

By utilizing databases in a transmitter and receiver to store predefined placement function information, bandwidth used to transmit superimposition information may be minimized. For example, a transmitter may send the superimposition information to a receiver as an index value associated with a particular positioning or placement function associated with a specific number of superimposed information bits X and a specific number Y of LSBs to be used to carry information bits in each selected pixel. The index may then be used to retrieve placement function information stored in a database on the receiver without transmitting all the placement function information.

If, however, at 510, the spectrum of the signal comprising image data and the superimposed information bits does not meet spectrum criteria, the process may move to 516 and information bit superimposer 106 may determine if there are more untested positions available from which a new set of one or more selected pixels may be chosen. If there are more positions to test the process moves to 518. At 518, information bit superimposer 106 determines selected pixels using an untested position. The operations of 508 and 510 are then repeated. The process will continue through operations 508, 510, 516, and 518, until the spectrum of the signal comprising image data and superimposed information bits in the LSBs of selected pixels is determined to meet system criteria at 510 or until it is determined at 516 that all available positions have been tested. When it is determined that a signal meets system criteria at 510, that signal and its superimposition information is transmitted at 512. When it is determined, at 516, that no more positions are available to test, the best spectrum from all positioning tested is chosen at 514 and the positioning that created that spectrum is used by information bit superimposer 106 to create the signal comprising image data and superimposed information bits in the LSBs of selected pixels. The signal created at 514 and its superimposition information is then transmitted at 512.

Figure 6A:
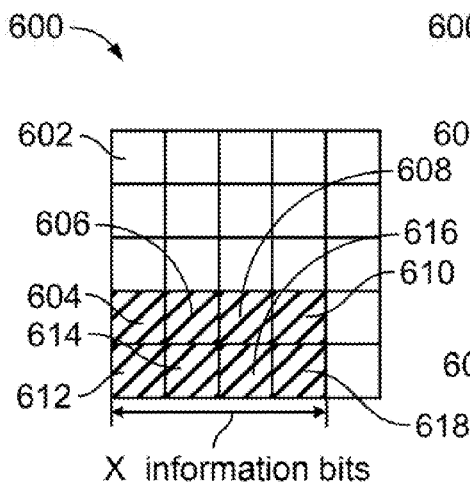
Figure 6B:
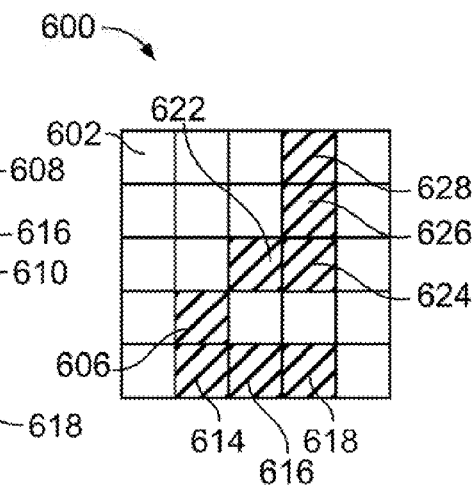

Referring now to FIGS. 6A and 6B, therein are diagrams illustrating example selections of pixels where information bits are superimposed onto the LSBs of the selected pixels. FIG. 6A illustrates pixel array portion 600 that includes image data encoded in pixels such as pixel 602. Array portion 600 may be a portion of a larger array of rows and columns of pixels, the size of which depends on the particular image/video/encoding done at bit source 102. In FIG. 6A, each of selected pixels 604, 606, 608, 610, 612, 614, 616, and 618 have been superimposed upon with information bits, that is, Y information bits have been embedded into the Y LSBs of each of pixels 604, 606, 608, 610, 612, 614, 616, and 618 to replace image data with information bits. In the example of FIG. 6A a total of eight pixels are used to carry a total of X information bits, where 8×Y=X. The number, Y, of LSBs used from each pixel may be selected based on the particular encoding scheme by which the image data is encoded and the importance of the bits to the quality of the image transmitted. In one implementation, the number of LSBs replaced may vary between pixels. In implementations, the size of the pixel array, number of selected pixels, number of LSBs used in each pixel, and number of information bits may be of any size or number. FIG. 6B illustrates a further example of a selection of pixels of array 600 in which image bits are replaced with information bits. FIG. 6B illustrates selected pixels 606, 614, 616, 618, 622, 624, 626, and 628. In each of FIGS. 6A and 6B a different position may define the selection of the pixels for superimposition of information bits onto the pixel LSBs that may be used at operation 506 and 508. The positions shown by FIGS. 6A and 6B may be included in those used in operation 508.

Referring now to FIG. 7, therein is a flow diagram illustrating example operations performed in a transmitting device according to a farther implementation of the embodiments. In the implementation of FIG. 7 the operations may be performed in a communications device that includes appropriate processors or circuitry, and memory including program code, configured to perform the functions illustrated in FIG. 1A. In the implementation of FIG. 7, signal criteria tester 114 includes functions in addition to the spectrum criteria testing functions. These include functions that determine whether the image data in the signal comprising the image data and the superimposed information bits meets signal criteria related to image quality criteria. That is, the signal criteria tester also determines whether the superimposing, of the information bits has affected image quality as well as spectrum in an unacceptable way. While FIG. 7 illustrates both spectrum criteria and image quality criteria testing combined as the requirement for meeting signal criteria, implementations of FIG. 7 may be also configured by omitting spectrum testing and using image quality as the test for meeting signal criteria. In those implementations signal criteria tester 114 would be configured to perform image quality testing.

The process of FIG. 7 begins at 702 where information bit superimposer 106 receives image bits from image bit source 104. The image bits may include bits having data on one or more still images, or bits having data on images of image frames that are part of a video. The image bits may include image bits encoded and configured as an array of image pixels. The image bit source 104 may be any type of source of video or image data. For example, image bit source 102 may be a video codec operating according to one or more of the MPEG, DivX, Xvid, or x264 video codec standards, or any other digital video encoding scheme. Image bit source may also provide images in formats such as, JPEG, TIFF, GIF, or any other image format that digitally encodes an image.

At 704, information bit superimposer 106 receives information bits from information bit source 102. The information bits may be associated with a particular image or group of image bits. For example, the information bits may include a hidden watermark, or an overlying caption or text that is to appear in an image or image frames of a video carried by a group of image bits. The information bits may also include bits carrying any other information that may be transmitted with an image or video, including, for example, a second hidden image to be embedded in a first image, digital rights related information about a particular image or audio information or an audio clip associated with an image. In other implementations, the information bits may include information that is independent of and not related to the image in which it is embedded. The information bits may be raw data bits or be encoded in any form that may be decoded at a receiver. For example, the information bits may be coded for error correction.

At 706, information bit superimposer 106 determines one or more selected pixels from the image pixel array using an initial positioning selection. The positioning is used to determine positions in the pixel array from which the selected pixels are chosen. The number of the one or more selected pixels may be based on the number of information bits in order that there is enough bit space in the selected pixels to carry the information bits. The positioning may be based on information retrieved from placement function database 116 that defines a positioning or placement. In other implementations, the positioning used at 706 may be any positioning that may be conveyed to a receiver so that the receiver will know the positioning of the selected pixels. In another implementation, the positioning may be determined based on a selection of one or more pixels that are selected because those one or more pixels carry image bits that are less critical to the transmitted image quality than other potential pixel selections.

At 708, information bit superimposer 106 superimposes or embeds the information bits onto the selected pixels of the image bits and creates a signal comprising image data that includes the superimposed information bits. In various implementations, the superimposing of the information bits may include superimposing information bits on complete pixels of the selected pixels or may include superimposing information bits only on a number of LSBs of the bits of the selected pixel.

At 710, signal quality tester 114 determines whether the image quality of the image carried in the signal comprising the image data and the superimposed information bits meets criteria related to image quality. For example, the criteria may be set based on a level of acceptable distortion of the image conveyed by the image data carrying the information bits as compared to the original image before superimposition of the information bits onto the image. In one configuration, it may be determined if the image quality meets the signal criteria based on a mean square error, root mean square deviation, or rate distortion function of the image or image frame of a video as compared to the original image or image frame.

Next at 712, signal criteria tester 114 determines whether the frequency spectrum of the signal comprising image data and the superimposed information bits meets system spectrum criteria. The determination as to whether the frequency spectrum of the signal meets system criteria may be performed, for example, as described for operation 210 of FIG. 2.

Next at 714 it is determined if both the image quality met signal criteria at 710 and if the spectrum met system criteria at 712. If it is determined that both the image quality met signal criteria at 710 and the spectrum met system criteria at 714, the process moves to 720. At 720, information bit superimposer 106 initiates action by sending the image signal and superimposition information to transmitter 110. The signal may be coded, pulse shaped, and transmitted to a receiving device.

If, at 714, it is determined that either the image quality did not meet signal criteria at 710 or the spectrum did not meet system criteria at 712, the process may move to 716. At 716, information bit superimposer 106 may initiate action to determine if there are more untested positions available from which a new set of one or more selected pixels may be chosen. If there are more positions to test the process moves to 718. At 718 information bits superimposer 106 determines the selected pixels using an untested position. The process will continue through operations 708, 710, 712, 714, 716, and 718, until the spectrum of the signal comprising image data and superimposed information bits is determined to meet both image quality criteria and system spectrum criteria at 714 and the process moves to 720 and initiates action as described above, or until it is determined at 716 that all available positions have been tested without both of image quality and spectrum signal criteria being satisfied and the process moves to 722. At 722 the superimposition of information bits onto the image data that has the best or most preferred combined image quality and spectrum related to the signal criteria of all tested positions may be chosen. In implementations, the selection of the superimposition and positioning of information bits onto the image data that has the best combined image quality and spectrum may be based on various criteria depending on system and application requirements. For example, if the spectrum criteria are based on system standards requirements, the spectrum may be weighted more heavily in the selection than image quality or the positioning with the best spectrum may be chosen. In another implementation the image quality and spectrum of the tested position may be weighted equally in the choice. In another implementation of FIG. 7, only image quality criteria may be tested 710 and operation 712 may be omitted; the signal with the best image quality may then be chosen for transmission.

From 722 the process moves to 720 and the image and superimposition information is transmitted.

The superimposition information may be transmitted and received as needed, for example as often as information bit superimposer 106 changes positioning of the selected pixels. In an implementation, information bit superimposer 106 may be configured to start the process of FIG. 7 each time the information bits change. For example when new text is to be displayed an initial acceptable positioning may be determined. If the information bits or image bits change causing the acceptable positioning to change, new superimposition information may be sent.

Referring now to FIG. 8, therein is a flow diagram illustrating example operations performed by a receiving device. In an implementation, the operations of FIG. 8 may be performed in a communications device that includes appropriate processors or circuitry, and memory including program code, configured to perform the functions illustrated in FIG. 1B. The receiving device may be configured to receive signals that comprise image data and superimposed information bits that are transmitted, for example, according to various implementations of FIG. 2 as described herein. The process of FIG. 7 may be described with reference to FIG. 1B.

The process begins at 802 where receiver 124 receives superimposition information transmitted by a transmitting device, such as transmitting device 100. At 804, receiver 124 receives the image signal including the information bits imbedded according to the superimposition information. Receiver 124 then provides the image data and superimposition information to information bit extractor 126.

At 806, information bit extractor 126 determines, using the superimposition information, a placing or placement function that was used at the signal transmitter to select the pixels of the image into which the information bits were superimposed. Next, at 808 information bit extractor 126 uses the determined placing or placement function to extract the superimposed information bits from the selected pixels. In extracting the information bits, the information bit extractor 126 may utilize superimposition information associated with the information bits, depending on the implementation used at the transmitter. For example, information bit extractor 126 may utilize superimposition information that includes a value X indicating the number of information bits in the image, a location Pi that indicates a pixel location in the image pixel array to use as a reference in applying the positioning, an image or frame indicator or a video to identify the frame in which the information bits are superimposed, or a placement function, along with an indication of the placement function. By storing predefined placement function information in placement function database 132, bandwidth used to transmit superimposition information may be minimized. For example, a transmitter may send the superimposition information to a receiver as an index value associated with, for example, a particular positioning or placement function associated with a specific number of superimposed information bits X. The index may then be used to retrieve placement function information stored in placement function database 132 without needing to transmit all the placement function information.

At 810, after the information bits are extracted, the information bits and image bits are sent to information bit processor 130 and image bit processor 128, respectively, for processing. Depending on the implementation the information bits may be used, for any intended purpose, for example, a caption or title defined by the information bits may be displayed on the image or a video that is reconstructed from the image bits.

Figure 9:
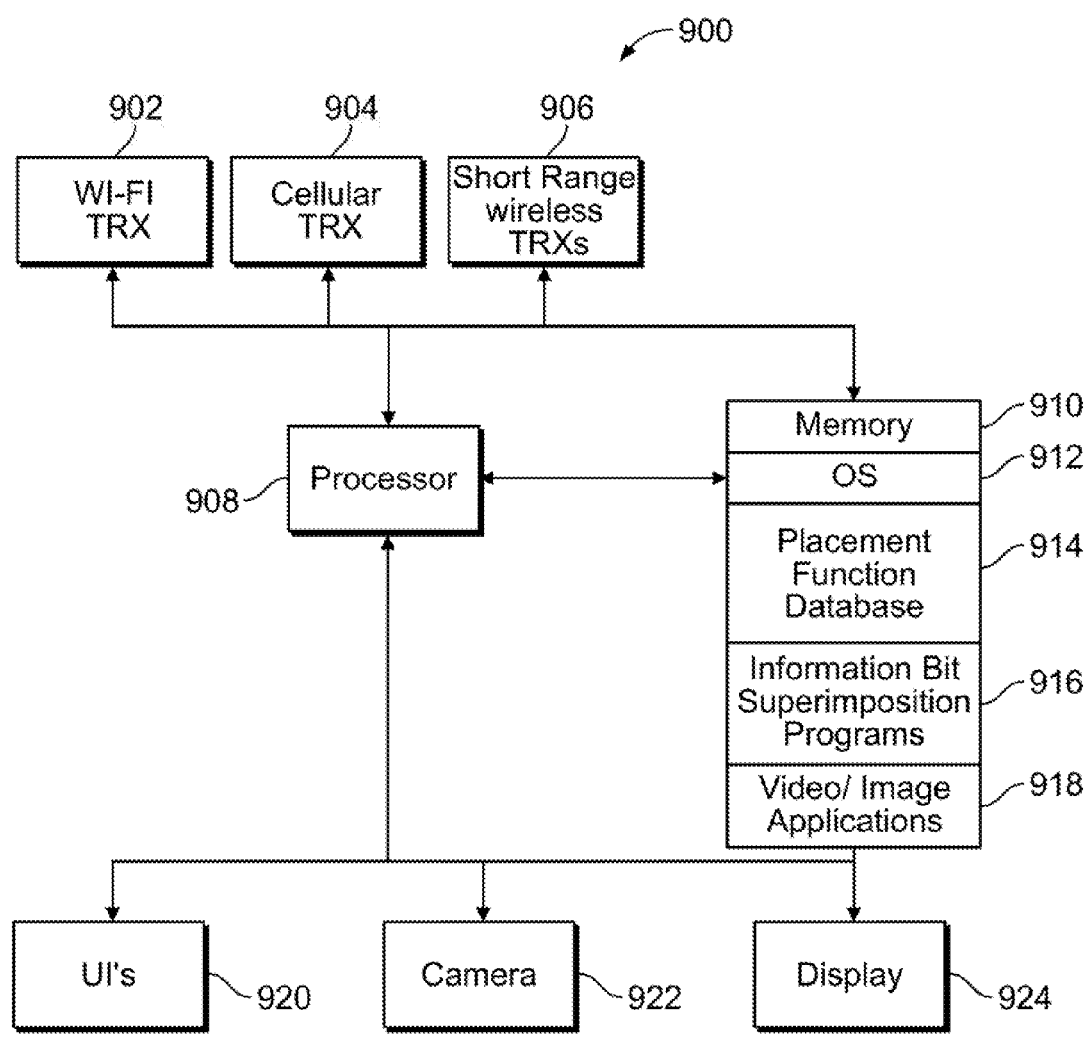

Referring now to FIG. 9, therein is a simplified block diagram of an example device 900 which may be implemented to perform operations according to the disclosed embodiments. Device 900 represents a possible implementation of any device that may transmit and/or receive signals including image bits and superimposed information bits according to the embodiments of the disclosure. Device 900 may include transceivers (TRXs) as shown by the examples of Wi-Fi TRX 902, cellular TRX 904, and short range TRXs 902. Wi-Fi TRX 904 may be configured to operate in any of the Wi-Fi frequency bands according to the any relevant IEEE 802.11 or any other standard specifications. Cellular TRX 903 may allow device 900 to operate in a cellular system, such as a GSM, WCDMA or LTE system. In other implementations, device 900 may include TRXs operable according to any wireless transmission scheme that allows transmission or reception of signals that include images or videos. Device 900 also may include user interfaces (UIs) 918 which may include any type of interface, for example, a touch screen/keypad, microphone, or speaker which receives inputs and provide outputs to and from device 900. Device 900 may also include camera 922 for taking pictures or capturing videos, and display 924 for displaying images and videos. Device 900 includes processor 908 and memory 910 which is shown as including program code for operating system (OS) 912, placement function database 914, information bit superimposition/extraction programs 916, and video/image applications 918. Memory 910 may also include other device applications. Memory 910 also may include data such as media data, camera photos and videos, contact data, calendar data, and other files used in the operation of applications on device 900. Processor 908 provides overall control of device 900 and the functional blocks shown in FIG. 1A and/or 1B by implementing instructions and code in memory 910 to provide functions for transmitting and receiving signals including image data and superimposed information bits Processing unit 908 may comprise one or more processors, or other control circuitry or any combination of processors and control circuitry.

Memory 910 may be implemented as any type of computer readable storage media in device 900, including non-volatile and volatile memory.

Implementations of device 900 may include configurations in any type of device utilizing image or video data, for example, implementations as a smart phone, a tablet computer, cameras, video cameras, a desktop computer, laptop computer device, gaming devices, media devices, smart televisions, home theater systems, smart automobile systems, smart house systems, multimedia cable/television boxes, smart phone accessory devices, tablet accessory devices, personal digital assistants (PDAs), portable media players, smart watches, smart sensors, or industrial control systems. Certain of the functional blocks shown in FIG. 9 may be omitted, added to, combined, or rearranged in these other implementations.

In the embodiments, execution of information bit superimposition extraction programs 916 causes processor 908 to implement operations that cause functions of device 900 to perform the operations illustrated in FIGS. 2-7 when transmitting and receiving signals including image data and superimposed information bits. Information bit superimposition/extraction programs 916 may cause device 900 to perform appropriate operations utilizing placement function database 114, when transmitting image data, or placement function database 132, when receiving image data, according to the disclosed implementations.

The example embodiments disclosed herein may be described in the general context of processor-executable code or instructions stored on memory that may comprise one or more computer readable storage media (e.g., tangible non-transitory computer-readable storage media such as memory 910). As should be readily understood, the terms "computer-readable storage media" or "non-transitory computer-readable media" include the media for storing of data, code and program instructions, such as memory 910, and do not include portions of the media for storing transitory propagated or modulated data communication signals.

While implementations have been disclosed and described as having functions implemented on particular devices operating in a network, one or more of the described functions for the devices may be moved between the devices and implemented on a different one of the devices than shown in the figures, or on different types of equipment.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Embodiments have been disclosed that included a device comprising one or more processors and memory in communication with the processor. The memory comprises code that when executed, causes the one or more processors to determine one or more selected pixels from a plurality of pixels associated with an image, superimpose information bits onto the one or more selected pixels, generate a signal from the plurality of pixels including the superimposed information bits in the one or more selected pixels, determine if the spectrum of the signal satisfies a criteria, and initiate an action based on whether or not the spectrum of the signal satisfies the criteria. The code may be further executable to cause the one or more processors to determine if the signal satisfies criteria by causing the one or more processors to determine if a spectrum of the signal satisfies spectrum criteria. The code may be further executable to cause the one or more processors to determine if the signal satisfies criteria by causing the one or more processors to determine if the image in the signal satisfies quality criteria. The code may be further executable to cause the one or more processors to initiate an action by causing the one or more processors to initiate transmission of the signal based on the signal satisfying the criteria. The code may be executable to cause the one or more processors to determine the one or more selected pixels from the plurality of pixels associated with the image using a placement function. The one or more selected pixels may comprises a first one or more selected pixels, the signal may comprise a first signal, and he code may be further executable to cause the one or more processors to initiate an action by causing the one or more processors to determine, based on the first signal not satisfying the criteria, a second one or more selected pixels from the plurality of pixels associated with the image, superimpose the information bits onto the second one or more selected pixels, generate a second signal from the plurality of pixels including the superimposed information bits in the second one or more selected pixels, determine if the second signal satisfies the criteria, and initiate transmission of the second signal based the second signal satisfying the criteria. The code may be executable to cause the one or more processors to determine the first one or more selected pixels from the plurality of pixels associated with the image using a first placement function, and determine the second one or more selected pixels from the plurality of pixels associated with the image using a second placement function.

The device memory may include code may that is further executable to cause the one or more processors to superimpose the information bits onto the one or more selected pixels by superimposing groups of the information bits onto one or more least significant bits of each of the one or more selected pixels. The code may be further executable to cause the one or more processors to determine the one or more selected pixels from the plurality of pixels associated with the image using a placement function that determines the one or more selected pixels from pixels of the plurality of, pixels based on criticality of the one or more selected pixels to the image quality. The code may be further executable to cause the one or more processors to initiate transmission of superimposition information to a receiver, the superposition information including an indication of the location of the information bits in the one or more selected pixels. The superimposition information may include a number of the information bits and the indication of the location includes a reference position indicating a position in the image that provides a reference for locating the information bits. The one or more selected pixels may comprise a first one or more selected pixels, the signal may comprise a first signal, and the code is further may be further executable to cause the one or more processors to initiate an action by causing the one or more processors to determine, based on the first signal not satisfying the criteria, a second one or more selected pixels from the plurality of pixels associated with the image, superimpose the information bits onto the second one or more selected pixels, generate a second signal from the plurality of pixels including the superimposed information bits in the second one or more selected pixels, determine if the second signal satisfies the criteria, determine, based on the second signal not satisfying the criteria, a preferred one of the first and second signal, and initiate transmission of a preferred one of the first and second signal.

The disclosed embodiments also include a device comprising one or more processors and memory in communication with the processor, the memory comprising code that when executed causes the one or more processors to receive superimposition information, the superimposition information associated with a signal, receive the signal from a transmitter, the signal comprising a plurality of pixels including one or more selected pixels, the one or more selected pixels including superimposed information bits, and extract the superimposed information bits from the plurality of pixels based on the superimposition information. The superimposition information may include an indication of a placement function that was used to superimpose the information bits on the one or more selected pixels. The code may be executable to cause the one or more processors to extract the superimposed information bits from the plurality of pixels based on the superimposition information by causing the one or more processors to determine the placement function from the indication in the superimposition information, and extract the superimposed information bits from the plurality of pixels using the placement function. The code may be executable to cause the one or more processors to control the device to extract the superimposed information bits from the plurality of pixels by causing the one or more processors to extract all bits from each of the one or more selected pixels based on the superimposition information. The code may be executable to cause the one or more processors to control the device to extract the superimposed information bits from the plurality of pixels by causing the one or more processors to extract a group of least significant bits from each of the one or more selected of pixels based on the superimposition information. The superimposition information may include an indication of a starting position for a placement function.

The disclosed embodiments also include a device comprising one or more processor and memory in communication with the processor, the memory comprising code that, when executed, causes the one or more processors to determine a first one or more selected pixels from a plurality of pixels comprising an image, superimpose information bits onto the first one or more selected pixels, generate a first signal from the plurality of pixels comprising the image and the superimposed information bits in the first one or more selected pixels, determine if the first signal satisfies a criteria, and, based on the first signal not satisfying the criteria, determine a second one or more selected pixels from the plurality of pixels comprising the image, superimpose the information bits onto the second one or more selected pixels, generate a second signal from the plurality of pixels comprising the image and the superimposed information bits in the second one or more selected pixels, determining if the second signal satisfies the criteria, and, initiate transmission of the second signal based on the spectrum of the second signal satisfying the criteria. The criteria may comprise spectrum criteria. The criteria may comprise quality criteria for the image. Also, the criteria may comprise spectrum criteria and quality criteria for the image.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as filling within the scope of the appended claims.

What is claimed is:

1. A device comprising:
one or more processors; and,
memory in communication with the one or more processors, the memory comprising code that, when executed, causes the one or more processors to:
determine one or more selected pixels from a plurality of pixels comprising an image, wherein the one or more selected pixels are determined according to a placement;
superimpose each of a plurality of information bits onto a bit of the one or more selected pixels in the image;
generate a signal from the plurality of pixels comprising the image and the superimposed plurality of information bits in the one or more selected pixels;
test the signal for conformance to a signal criteria to determine if use of the placement to determine the one or more selected pixels results in the signal being acceptable for transmission; and,
if the signal meets the signal criteria, initiate transmission of the signal.

2. The device of claim 1, wherein the signal criteria is a spectrum criteria.

3. The device of claim 1, wherein the placement is based on the criticality of the one or more selected pixels to the image quality.

4. The device of claim 1, wherein the one or more selected pixels comprises a first one or more selected pixels, the signal comprises a first signal, the placement comprises a first placement, and wherein the code is further executable to cause the one or more processors to initiate an action by causing the one or more processors to:
determine, bused on the spectrum of the first signal not meeting the signal criteria, a second one or more selected pixels from the plurality of pixels comprising the image, wherein the second one or more selected pixels are determined according to a second placement;
superimpose each of the plurality of information bits onto a selected bit of the second one or more selected pixels in the image;
generate a second signal from the plurality of pixels including the superimposed plurality of information bits in the second one or more selected pixels;
test the second signal for conformance to the signal criteria to determine if use of the second placement to determine the one or more selected pixels results in the signal being acceptable for transmission; and,
if the second signal meets the signal criteria, initiate transmission of the second signal.

5. The device of claim 4, wherein the placement is based on a criticality of the one or more selected pixels to the image quality.

6. The device of claim 1, wherein the code is further executable to cause the one or more processors to initiate transmission of superimposition information to a receiver, the superposition information including an indication of the placement.

7. The device of claim 1, wherein the one or more selected pixels comprises a first one or more selected pixels, the placement comprises a first placement, the signal comprises a first signal, and wherein the code is further executable to cause the one or more processors to initiate an action by causing the one or more processors to:
determine, based on the first signal not meeting the criteria, a second one or more selected pixels from the plurality of pixels comprising the image according to a second placement;
superimpose each of the plurality of information bits onto a bit of the second one or more selected pixels in the image;
generate a second signal from the plurality of pixels including the superimposed plurality of information bits in the second one or more selected pixels at the image level;
test the second signal for conformance to the signal criteria to determine if use of the second placement to determine the one or more selected pixels results in the signal being acceptable for transmission;
determine, based on the second signal not meeting the signal criteria, a preferred one of the first and second signal; and
initiate transmission of a preferred one of the first and second signal.

8. A device comprising:
one or more processors; and,
memory in communication with the one or more processors, the memory comprising code that, when executed, causes the one or more processors to control the device to:
receive superimposition information, the superimposition information associated with a signal and indicating a placement;
receive the signal from a transmitter, the signal comprising a plurality of pixels including one or more selected pixels, the one or more selected pixels including a plurality of superimposed information bits, wherein each of the plurality of superimposed information bits is superimposed onto a selected bit of the one or more selected pixels at the image level according to the placement; and,
extract each of the superimposed information bits from its corresponding selected bit of the one or more selected pixels based on the placement indicated by the superimposition information.

9. The device of claim 8, wherein the code is executable to cause the one or more processors to control the device to extract each of the superimposed information bits from its corresponding selected bit of the one or more selected pixels by causing the one or more processors to:
extract a subset of bits from the bits in each of the one or more selected pixels based on the superimposition information.

10. The device of claim 8, wherein the code is executable to cause the one or more processors to control the device to extract each of the plurality of superimposed information bits from its corresponding selected bit of the one or more selected pixels by causing the one or more processors to:
  extract all bits from each of the one or more selected pixels based on the superimposition information.

11. The device of claim 8, wherein the superimposition information includes an indication of a starting position for the placement.

12. A device comprising:
  one or more processors and memory in communication with the one or more processors, the memory comprising code that, when executed, causes the one or more processors to:
    determine a first one or more selected pixels from a plurality of pixels comprising an image;
    superimpose information bits onto the first one or more selected pixels;
    generate a first signal from the plurality of pixels comprising the image and the superimposed information bits in the first one or more selected pixels;
    determine if the first signal satisfies a criteria; and,
    based on the first signal not satisfying the criteria;
    determine a second one or more selected pixels from the plurality of pixels comprising the image;
    superimpose the information bits onto the second one or more selected pixels;
    generate a second signal from the plurality of pixels comprising the image and the superimposed information bits in the second one or more selected pixels;
    determine if the second signal satisfies the criteria; and,
    initiate transmission of the second signal based on the second signal satisfying the criteria.

13. The device of claim 12 wherein the criteria comprises spectrum criteria.

14. The device of claim 12 wherein the criteria comprises quality criteria for the image.

15. The device of claim 12 wherein the criteria comprises spectrum criteria and quality criteria for the image.

* * * * *